Jan. 8, 1929.

J. F. PALMER 1,698,414

PNEUMATIC TIRE

Filed May 19, 1922

Witnesses

Inventor
John F. Palmer

Jan. 8, 1929.
J. F. PALMER
1,698,414
PNEUMATIC TIRE
Filed May 19, 1922
2 Sheets-Sheet 2
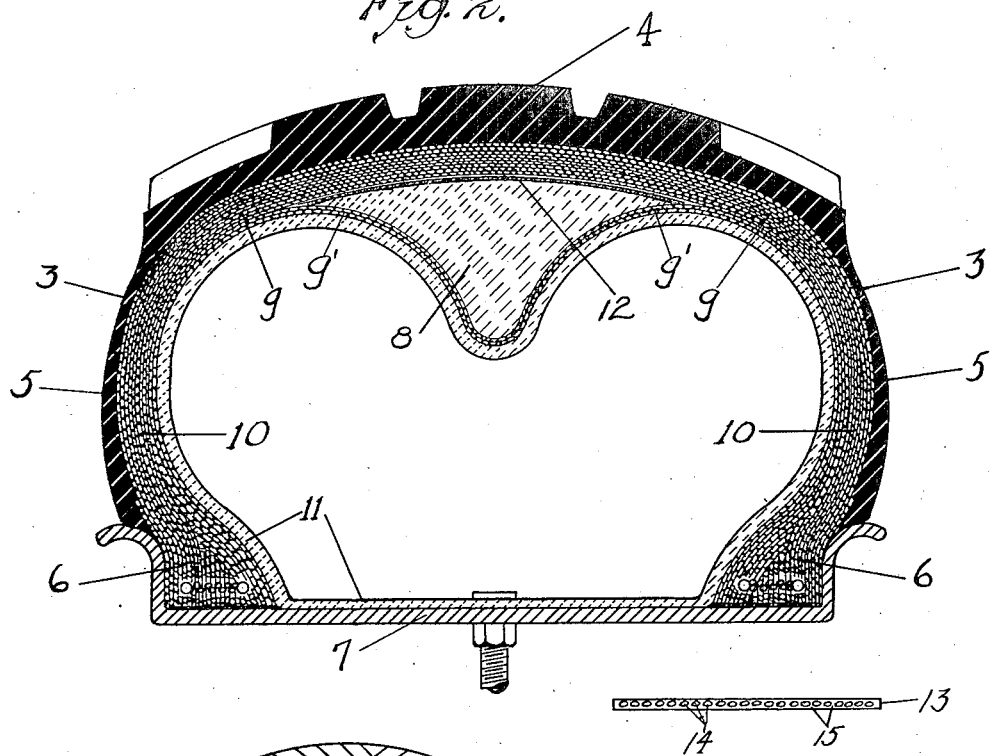
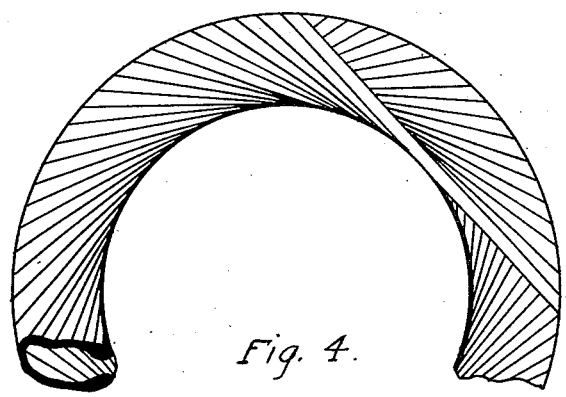

Patented Jan. 8, 1929.

1,698,414

UNITED STATES PATENT OFFICE.

JOHN FULLERTON PALMER, OF ST. JOSEPH, MICHIGAN.

PNEUMATIC TIRE.

Application filed May 19, 1922. Serial No. 562,235.

This invention relates to pneumatic tires, and the principal object of the invention is to provide a pneumatic tire of substantially oblate, cross-section especially adapted for heavy duty.

Another object of the invention is to construct a tire of oblate cross-section of greater width than depth in which distortion of the tread portion from a normal contour either outwardly or inwardly is resisted by resilient means, and the advantages incident to a tire of a relative lesser depth and width may be obtained, such as reduction of the disturbance of wheel balance upon blowing out of the tire and greater area of contact with the road.

Another object is to provide a tire of oblate cross-sectional contour in which distortion from flat tread contour will be resiliently resisted, this resistance serving to assist the load on the tire in returning the contour to flat condition when desirable tread contact is obtained.

Attempts have been made to produce a tire of this character over a long period of years by the use of restraining means located externally of the inner carcass, but such means have been non-resilient and impractical as well as lacking in durability. I obtain my results by the provision of a resilient or elastic rib associated with the carcass of the tire which will not only maintain the contour of a desired flatness but will resist distension or depression of the tread and function to normally return the carcass to, or toward the desired contour.

In manufacturing the tire according to the instant invention, I find it desirable to utilize principles set forth in my Patent No. 924,571 of June 8, 1909 for example, wherein is described a method of forming what I term a tangent-wound carcass.

These and other objects will be more fully set forth and described in the following specification and shown in the accompanying drawings, in which:—

Fig. 2 represents a similar section showing a desirable contour of the same under inflation.

Fig. 3 embodies a cross-section through one of the strips used in the formation of the tire casing.

Fig. 4 is a side elevation of a portion of the carcass in the process of formation illustrating the tangent-wound construction.

Figure 5:
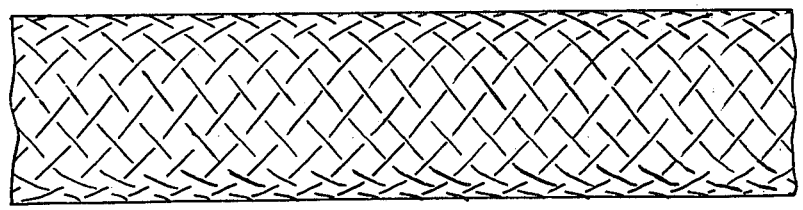

Fig. 5 is a plan view of a portion of a braided metal member incorporated within the bead of the carcass.

Figure 6:

Fig. 6 is very similar to Fig. 5 showing the metal member as elongated or stretched to final position.

Like numerals refer to like elements throughout the drawings.

Figure 1:
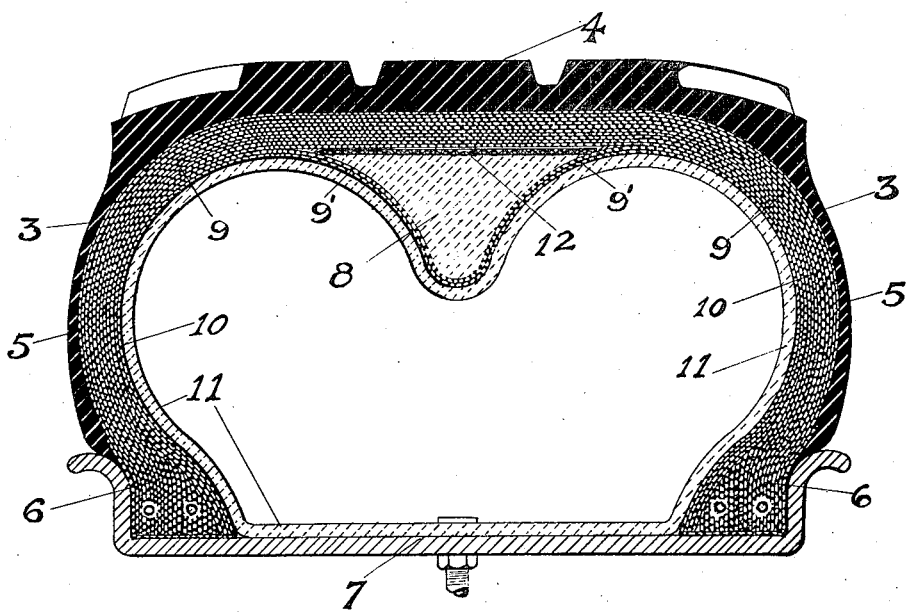
Fig. 1 shows a cross-section of a tire embodying my invention with little or no inflation.

In carrying out the invention of a tire embodying my invention, I may use a mould of segmental construction having an outer contour conforming to the normal uninflated contour of the tire as illustrated in Fig. 1.

In constructing the tire, for illustration, I utilize strips 13 shown in Fig. 3 consisting of longitudinally arranged parallel cords 14 embedded in a rubber sheathing, these strips being wound tangentially as illustrated in Fig. 4, and in accord with the disclosures in my prior Patent No. 924,571 of June 8, 1909.

A preliminary lining or envelope 9' may be formed by one or more plies of carcass members 9 as illustrated in Fig. 1, after which the rib 8 may be formed of resilient rubber moulded or otherwise placed in the groove or depression provided. On the base portion of the rib 8 is provided a breaker strip of open net-like fabric in a well known manner, after which the balance of the carcass 9 may be wound with a substantial flat tread portion, as illustrated in the drawing.

I may incorporate at the free edges of the casing stretch resisting members comprising braided wire 6 first laterally expanded, as illustrated in Fig. 5 and incorporated in the free edges between the plies of the carcass. The edges of the carcass are then subjected to a radial stretching to eliminate a portion of the inherent stretch and to distend the braided wire 6 to remove substantially all of its extensibility. The provision of the metal strip resisting members and beads I find unnecessary in some sizes and styles of tires, but it may be desirable under certain conditions, especially in large size tires where due to the width of the rim, the strain to which the beads are subjected is great.

After completion of the carcass, a casing 3 of rubber comprising the flat tread portion 4 and the side walls 5 may be applied and the entire casing subjected to vulcanizing or curing in well known manner either before or after removing the inner core by the employment of any of the methods now practiced in the art.

The rib 8 is preferably formed with its sides curved to form a continuation of the curvature of the side walls 10 of the carcass.

I have found it desirable to so construct the tire as to strength and resistance to inflation that a slight arch or crown is obtained when the desired inflation is applied as indicated in Fig. 2. With this condition obtained, under load, sufficient flattening of the tire will occur to permit a large area of contact with the road. The rib 8 being under tension when inflated, as shown in Fig. 2, will assist in returning the contour of the casing to normal, which is the desirable contour, but will resist further depression of the casing beyond normal as will be obvious. In short, resilient rib 8 will resist any extension or distention of the casing from normal contour and will assist the return to normal contour.

While I have described and shown a tangent-wound casing and while this method of construction is especially adapted to co-operate with the rib in maintaining an oblate section, it is obvious that my invention may be utilized with other methods of carcass formation.

I find it especially desirable to utilize with this construction of tire an inner tube moulded to conform to the tire, and in Figs. 1 and 2 I have illustrated such a tube 11.

The tire formed as described and shown has a relatively great width while its depth radially of the wheel is relatively less and a large load may be better supported and cushioned on a casing of greatly reduced size as compared with present day heavy duty tires. the contact area being properly reduced under light loads while the disturbance of the wheel balance upon blowing out a tire is minimized due to the reduced radial depths.

It will also be understood that the resilient rib or means resists the distortion from normal which is the desirable contour under inflation and assists the load in returning the tire to normal.

It will be understood that while I have shown and described one embodiment of my invention, I do not wish to be restricted to such showing and description except as defined in the appended claims.

I claim:

1. In combination, a pneumatic tire casing having a normally oblate cross-sectional contour, a tread member secured to said casing, and resilient restraining means coacting with said casing to resist deformation from said contour.

2. In combination, a pneumatic tire casing having a normally oblate cross-sectional contour, and resilient restraining means coacting therewith to resist deformation from said contour, said means comprising a resilient restraining member located at the inner side of said casing.

3. A pneumatic tire casing having a normally oblate cross-sectional contour and resilient restraining means coacting therewith to resist deformation from said contour; said means comprising a continuous annular resilient restraining rib projecting inwardly of said casing.

4. A pneumatic tire of normally oblate cross-sectional contour, its depth from bead line to tread portion being appreciably less than its width, a tread member secured to said casing, and an annular resilient restraining means coacting therewith to resist deformation of said contour.

5. A pneumatic tire casing of normally oblate sectional contour, the tread portion thereof merging with the side walls, in combination with an annular flexible resilient member relatively thick at its central portion and diminishing at either side and functioning to resist distension of the tread and side walls from normal contour.

6. A pneumatic tire casing of normal non-circular sectional contour and having a tread member secured thereto and having associated therewith resilient means to resist distension of said casing under inflation and to assist depression of said casing under load when inflated.

In testimony whereof I affix my signature.

JOHN FULLERTON PALMER.